United States Patent
Delnick et al.

(10) Patent No.: US 9,859,583 B2
(45) Date of Patent: Jan. 2, 2018

(54) POLYARENE MEDIATORS FOR MEDIATED REDOX FLOW BATTERY

(71) Applicants: National Technology & Engineering Solutions of Sandia, LLC, Albuquerque, NM (US); UT-Battelle, LLC, Oak Ridge, TN (US)

(72) Inventors: Frank M. Delnick, Maryville, TN (US); David Ingersoll, Albuquerque, NM (US); Chengdu Liang, Knoxville, TN (US)

(73) Assignees: National Technology & Engineering Solutions of Sandia, LLC, Albuquerque, NM (US); UT-Battelle, LLC, Oak Ridge, TN (US)

( * ) Notice: Subject to any disclaimer, the term of this patent is extended or adjusted under 35 U.S.C. 154(b) by 73 days.

(21) Appl. No.: 14/515,423

(22) Filed: Oct. 15, 2014

(65) Prior Publication Data

US 2015/0255803 A1    Sep. 10, 2015

Related U.S. Application Data

(60) Provisional application No. 61/947,719, filed on Mar. 4, 2014.

(51) Int. Cl.
*H01M 8/18* (2006.01)
*H01M 4/86* (2006.01)
(Continued)

(52) U.S. Cl.
CPC ......... *H01M 8/188* (2013.01); *H01M 4/8652* (2013.01); *H01M 4/9041* (2013.01); *H01M 8/0221* (2013.01); *Y02E 60/528* (2013.01)

(58) Field of Classification Search
None
See application file for complete search history.

(56) References Cited

U.S. PATENT DOCUMENTS

| | | |
|---|---|---|
| 5,366,824 A | 11/1994 | Nozaki et al. |
| 8,722,226 B2 | 5/2014 | Chiang et al. |
| | (Continued) | |

FOREIGN PATENT DOCUMENTS

SG    WO 2013012391 A1 *    1/2013    ............. H01M 8/20

OTHER PUBLICATIONS

Huang, et al., "Reversible Chemical Delithiation/Lithiation of LiFePO4: Towards a Redox Flow Lithium-Ion Battery," Phys. Chem. Chem. Phys., vol. 15, 2013, pp. 1793-1797.

(Continued)

*Primary Examiner* — Sarah A Slifka
*Assistant Examiner* — Wojciech Haske
(74) *Attorney, Agent, or Firm* — Medley, Behrens & Lewis, LLC; Kevin W. Bieg

(57) ABSTRACT

The fundamental charge storage mechanisms in a number of currently studied high energy redox couples are based on intercalation, conversion, or displacement reactions. With exception to certain metal-air chemistries, most often the active redox materials are stored physically in the electrochemical cell stack thereby lowering the practical gravimetric and volumetric energy density as a tradeoff to achieve reasonable power density. In a general embodiment, a mediated redox flow battery includes a series of secondary organic molecules that form highly reduced anionic radicals as reaction mediator pairs for the reduction and oxidation of primary high capacity redox species ex situ from the electrochemical cell stack. Arenes are reduced to stable anionic radicals that in turn reduce a primary anode to the charged state. The primary anode is then discharged using a second lower potential (more positive) arene. Compatible separators and solvents are also disclosed herein.

15 Claims, 1 Drawing Sheet

(51) Int. Cl.
H01M 4/90 (2006.01)
H01M 8/0221 (2016.01)

(56) References Cited

U.S. PATENT DOCUMENTS

| | | | |
|---|---|---|---|
| 2009/0176162 A1* | 7/2009 | Exnar | H01B 1/122 |
| | | | 429/336 |
| 2010/0141211 A1 | 6/2010 | Yazami | |
| 2013/0224550 A1* | 8/2013 | Bugga | H01M 8/188 |
| | | | 429/105 |
| 2014/0030623 A1 | 1/2014 | Chiang et al. | |
| 2014/0154546 A1 | 6/2014 | Carter et al. | |
| 2014/0178735 A1* | 6/2014 | Wang | H01M 8/20 |
| | | | 429/105 |

OTHER PUBLICATIONS

Tan, et al., "Synthesis and Characterization of Biphenyl-Based Lithium Solvated Electron Solutions," The Journal of Physical Chemistry B, vol. 116, 2012, pp. 9056-9060.

Holy, N. L., "Reactions of the Radical Anions and Dianions of Aromatic Hydrocarbons," Chemical Reviews, vol. 74, Issue 2, 1974, pp. 243-277.

Buchanan, et al., "Differentiation of Polycyclic Aromatic Hydrocarbons Using Electron Capture Negative Chemical Ionization," Org. Mass. Spec. vol. 19, No. 10, 1984, pp. 486-489.

* cited by examiner

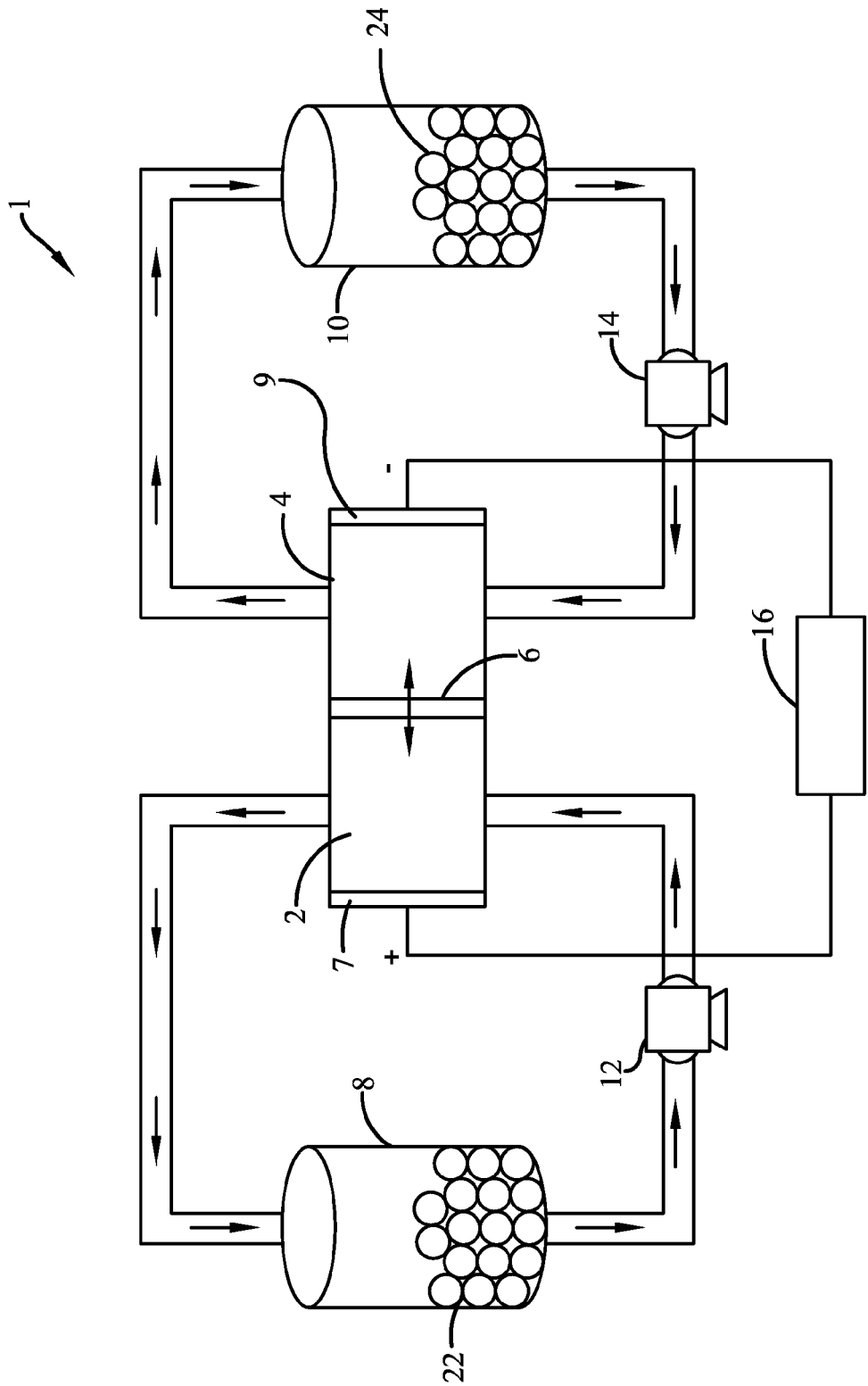

POLYARENE MEDIATORS FOR MEDIATED REDOX FLOW BATTERY

CROSS-REFERENCE TO RELATED APPLICATIONS

This application claims the benefit of priority of U.S. Provisional Patent Application Ser. No. 61/947,719, filed Mar. 4, 2014, and entitled "MEDIATED REDOX FLOW BATTERIES," the entirety of which is incorporated herein by reference.

GOVERNMENT RIGHTS

This invention was made with Government support under Contract No. DE-AC04-94AL85000 between Sandia Corporation and the U.S. Department of Energy. The Government has certain rights in the invention.

BACKGROUND

The energy content of a battery is proportional to its operating voltage, and high voltage may be achieved by utilizing anode materials which are oxidized and reduced at very negative potentials. Currently high energy batteries contain anodes comprised of alkali metals, alkali metal alloys and/or lithium intercalated carbon. These high voltage anodes typically operate outside of the thermodynamic window of their respective electrolytes and only function through the formation of a passive film which permits cation transport but blocks electron transport thereby inhibiting the self-discharge of the battery. Although essential for battery operation, these passive films also limit charge/discharge rates and contribute to irreversible losses in the cells which, in turn limit, cycle life.

These issues can be resolved, in part, by using a liquid alkali metal anode (e.g., molten sodium) and a solid electrolyte as demonstrated with the "zebra" cell technology. However, these cells operate at high temperature.

It is also recognized that unlimited cycle life can be obtained by using solvated transition metal anode and cathode materials as demonstrated by the all-vanadium redox flow battery system. However, the high solvent content required to solvate the electroactive vanadium and the low voltage of the V+2/V+3 redox reaction yield a very low energy density despite the long cycle life.

Recently Yazami (U.S. published application 2010/0141211 and Tan, Grimsdale, Yazami, J. Phys. Chem. B, 116 (2012) p. 9056) proposed that polyaromatic hydrocarbons could be reduced with Li metal to form a solvated electron, and the solvated electron is stabilized as the ion pair Li+ (polyarene$^{•-}$), which could serve as a "liquid lithium anode." In effect, energy is stored at the anode as a soluble anion radical. This concept may enable virtually unlimited cycle life at very high negative potential, however, the energy density is still limited by the high electrolyte content needed to solvate the radical anion. The capacity of Yazami's highest conductivity composition $(Li_{1.0}\beta_{1.0}(THF)_{8.2})$ is 36 mAHr/g ($\beta$=Biphenyl).

Separators are required for the organic solvent mediated redox flow battery to prevent the intermixing of the redox mediators in the electrochemical stack. However, these separators should be highly stable, and typically more stable than separators that are used in aqueous systems because the voltage drop across the separator is significantly larger and the organic electrolytes are typically more aggressive against conventional polymers used for aqueous separators.

SUMMARY

Mediated redox flow battery systems comprising a first and second soluble electrochemical mediator are disclosed herein. In a general embodiment, the mediator comprises a first arene (arene). In a charge cycle, the arene$^1$ is reduced in the anode chamber of a cell stack of a redox flow battery to form a first anion radical (anion radical). The anion radical$^1$ is transferred to a reservoir container that contains a solid active anode material that is reduced to the charge state by the anion radical$^1$. Also as a result of this process, the anion radical$^1$ is converted back to the parent arene$^1$. The arene$^1$ is recycled back to the anode chamber of the cell stack where it is again reduced to the anion radical$^1$ and again recycled back to the reservoir to reduce more of the solid anode material. This process continues until complete charge of the solid active anode material.

For discharge, a second arene$^2$ is circulated to the reservoir container where it is reduced by the charged active anode material to form a second anion radical (anion radical$^2$), whereby as a result of this reaction the anode is also oxidized. The anion radical$^2$ is cycled to the anode chamber of the cell stack where it is oxidized back to the parent arene$^2$ and then recycled back to the reservoir where it is again reduced by the solid charged anode. This process is continued until the anode is discharged, i.e. oxidized.

Redox potential of arene$^1$ should be more negative than the redox potential of the solid active anode material, and the redox potential of arene$^2$ must be more positive than redox potential of the solid active anode material. Arene$^1$ and arene$^2$ are dissolved in the same electrolyte solution.

In an embodiment, a similar process can take place at the solid cathode reservoir using different mediators with redox potentials that bracket the redox potential of the solid active cathode material. An ion exchange separator is supplied in the cell stack to prevent intermixing of anode and cathode mediators.

A highly stable separator and excellent solvent mediators for the mediated redox flow battery are also presented herein. In a general embodiment, a redox flow battery includes a half-cell electrode chamber coupled to a current collector electrode, and a polymeric lithium and/or sodium ion conducting separator coupled to the half-cell electrode chamber. The half-cell electrode chamber comprises a first redox-active mediator and a second redox-active mediator, and the first redox-active mediator and the second redox-active mediator are circulated through the half-cell electrode chamber into an external container. The external container includes an active electrode material. The active electrode material has a redox potential between a redox potential of the first redox-active mediator and a redox potential of the second redox-active mediator. The first mediator includes a first arene, and the first arene is a polyaromatic hydrocarbon, biphenyl, or a substituted derivative of either thereof.

In an embodiment, a redox flow battery includes a half-cell electrode chamber coupled to a current collector electrode. The half-cell electrode chamber comprises a first redox-active mediator and a second redox-active mediator, wherein the first redox-active mediator and the second redox-active mediator are circulated through the half-cell electrode chamber into an external container. The external container includes an active electrode material. The active electrode material has a redox potential between a redox potential of the first redox-active mediator and a redox potential of the second redox-active mediator. The first mediator comprises a first arene, wherein the first arene is biphenyl or a substituted derivative thereof.

In an embodiment, a battery includes an anode including an anode chamber coupled to an anode current collector electrode, a cathode including a cathode chamber coupled to a cathode current collector electrode, and a separator disposed between the anode and cathode, the separator comprising polyethylene oxide.

The above description presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

Additional features and advantages are described herein, and will be apparent from the following Detailed Description and the FIGURES.

BRIEF DESCRIPTION OF THE DRAWINGS

FIG. 1 is a diagram of an exemplary redox flow battery.

DETAILED DESCRIPTION

Redox flow batteries and storing and releasing energy are disclosed herein. In alternative embodiments, a mediated redox flow battery employs anion radicals with very negative redox potentials (close to the Li+/Li and Na+/Na potentials) that participate as chemical mediators in redox reactions on the surface of high capacity electrode materials. Arenes, such as polyaromatic hydrocarbons (polyarenes), or biphenyl, and substituted derivatives of either thereof can be reversibly oxidized and reduced at very negative potentials in selected solvents. Examples of these arenes include methylnaphthalene, naphthalene, acenaphthalene, pyrene, anthracene, coronene, perylene, tetracene, fluorine, azulene, chrysene. The reduction of these arenes is kinetically very fast and yields an anion radical (arene$^{\cdot-}$) which readily oxidizes back to the parent arene.

This unique approach combines the concept of the liquid solvated anion radical anode with redox flow battery technology to dramatically increase the energy density of redox flow batteries as will be illustrated below. In order to avoid the tremendous limitation imposed by the high electrolyte content required to solvate the anion radical as in a conventional redox flow battery, we propose that the anion radical[1] (a first mediator) will be circulated along with electrolyte and a second mediator to a reactor container that is external to the cell stack, which will serve as a plug-flow-reactor. The container will include an active (primary) anode material that in an embodiment will be in a dense, solid form, such as a packed bed of particulate material.

In a charge cycle, the anion radical[1] will chemically reduce the solid primary anode material in the reactor container to the charged state and the parent arene[1] will then circulate back to the electrode stack for electrochemical reduction (regeneration) back to the arene anion radical[1] (arene$^{\cdot-}$). To discharge the primary anode, a second mediator, which may also be a solvated arene[2] is included in the system. The discharge process operates in a similar manner as the charge process, but with the second mediator, while the first mediator is inactive in this process.

With reference to FIG. 1, illustrated is an exemplary mediated redox flow battery 1 in accordance with the present disclosure. The redox flow battery includes two half-cell electrode chambers—a cathode cell chamber 2 and an anode cell chamber 4. The two half-cell chambers 2, 4 are coupled to, and separated by, a separator 6. At the terminal end of the cathode cell chamber 2 is a cathode current collecting electrode 7 and at the terminal end of the anode cell chamber 4 is an anode current collecting electrode 9. Two electrolyte and mediator solutions flow through the half-cell chambers 2, 4. In an embodiment, porous current collectors are placed up against the separator 6 and the electrolyte flows past the back-side of the current collector in serpentine flow channels.

Thus, a first electrolyte and mediators flows through the cathode cell chamber 2 and a second electrolyte and mediators flow through the anode cell chamber 4.

The flow battery 1 further includes a cathode container 8 and an anode container 10 in which additional amounts of the first and second mediator and the first and second electrolyte are stored and circulated. In the mediated redox flow battery 1, the cathode and anode containers 8, 10 also contain an active electrode material 22, 24, respectively, an active cathode 22, and an active anode 24. The active electrode material 22, 24, is depicted as a bed of solid particulate or spherical bead material, but other forms could be used. A material with a high surface area may be preferred in some embodiments to provide better access to reactive surfaces of the solid for redox reactions with the mediators. In an embodiment, the active electrode material is non-flowable and does not circulate out of the cathode and anode containers 8, 10. The high density of the solid material allows for improved charge density over storing charge in a liquid.

In an embodiment, the containers 8, 10 and active electrode materials 22, 24 are configured as plug-flow reactors and function as plug-flow reactors hosting redox reactions between the mediators and the active electrode materials.

Moreover, in the embodiment of FIG. 1, the mediated redox flow battery 1 includes a cathode pump 12 and an anode pump 14. The cathode pump 12 causes the liquid electrolyte and first and second mediators to flow from the cathode container 8 into the cathode cell chamber 2, where the electrolyte and mediators can flow through the cathode cell chamber 2 and return to the cathode container 8. Similarly, the anode pump 14 can cause the electrolyte and mediators to flow from the anode container 10 into the anode cell chamber 4, where the electrolyte and mediators can flow through the anode cell chamber 4 and return to the anode container 10. In alternative embodiments, the components may be arranged to provide gravimetric flow of the mediators and electrolyte.

Furthermore, an electrical circuit is completed through the components listed above and through an electrical component 16. If the electrical component 16 is an electrical power source, then the mediated redox flow battery 1 can be charged. If the component 16 is an electrical power load, then the mediated redox flow battery 1 can be discharged.

In an embodiment, the mediated redox flow battery has a high voltage capability in a single cell. The voltage may range from, 1 to 4 volts, such as 1.5 and 3 volts, or 2 to 3.5 volts. If necessary, the voltage of the battery cell stack may be adjusted by adding cells in a conventional manner for a flow battery.

Having described the general structure and operative contents of the exemplary mediated redox flow battery 1 further details of the components and the process of storing and releasing energy will now be described.

In a method of storing and releasing electrical energy by mediating electrochemical reactions, the soluble electrochemical mediator comprising a first arene that is reduced in the anode chamber (of the cell stack) of a redox flow battery to form a first anion radical. The first anion radical is circulated to an external container that contains a solid anode material that is reduced to the charge state by the first anion radical, and the first anion radical is converted back to the parent first arene. The first arene is recycled back to the anode chamber stack where it is again reduced to the first anion radical and again recycled back to the container to reduce more of the solid anode. This process continues until complete charge of the anode.

For discharge, a second arene is circulated to the container where it is reduced by the charged anode to form a second anion radical. The second anion radical is cycled to the anode chamber (of the cell stack) where it is oxidized back to the parent second arene and recycled back to the container, where it is again reduced by the solid charged anode. This process may continue until the anode is discharged.

The redox potential of the first arene should be more negative than the redox potential of the solid anode, and the redox potential of the second arene should be more positive than the redox potential of the anode. The first arene and second arene are dissolved in the same electrolyte solution and are circulated through the system together. Ionic conducting membrane should be supplied in the cell stack to prevent intermixing of anode and cathode mediators, and to allow for the passage of ions, such as Li ions.

The same process can take place on the cathode side of the mediated redox flow battery using mediators with redox potentials that bracket the redox potential of the solid cathode material. In an embodiment, the flow rates may be different in the anode and cathode.

Factors limiting the number of charge-discharge cycles that can be applied are the abilities of each battery component (charge-transfer materials, mediators, solvents, membrane, electrode support, or hardware) to resist chemical breakdown or phase transition after long-term aging or exposure to abusive conditions.

The ion conducting membrane is a selective barrier that allows passage of certain ionic species to balance charge and complete the electrical circuit while preventing mediator molecules from passing through. During battery discharge, while a cathode mediator is being reduced and an anode mediator is being oxidized, the charge may be balanced by the transport of lithium ions through the membrane from the anode side to the cathode side. Alternatively, the charge may be balanced by the transport of anions from the supporting electrolyte, such as, for example, triflate (trifluoromethane sulfonate) anion, from the cathode side to the anode side. During battery charge, while a cathode mediator is being oxidized and an anode mediator is being reduced, the charge may be balanced by the transport of lithium ions through the membrane from the cathode side to the anode side. Alternatively, the charge may be balanced by the transport of anions from the supporting electrolyte, such as, for example, triflate (trifluorometahne sulfonate) anion, from the cathode side to the anode side. Optimum performance will be achieved if the membrane prevents any mediator molecules from passing through from one side of the cell to the other while allowing passage of ions from the supporting electrolyte.

One of skill in the art will appreciate that the described process for anode and cathode half-cells may be paired together to form a complete mediated redox flow battery process with both half-cells working in conjunction and the electrode chambers being electrically coupled through, e.g. a separator membrane that functions to allow ionic charge to pass through but not to allow the mediators themselves to pass through.

Having described the general structure and process of an embodiment of the mediated redox flow battery, further details on the materials and properties of the components are provided below.

In an embodiment, a fully mediated flow battery system with a given chemistry has a total of four mediator compounds, two for the positive electrode and two for the negative electrode. However, in an embodiment, a flow battery half-cell can be paired with a conventional or even a non-flowing half-cell to form a battery.

The first and second mediators function to shuttle charge to and from the active anode or cathode in the container to the cell stack through the redox process described in detail above. The use of redox mediators provides certain features to the system. First, the mediators allow for the active materials to be stored in the external tank instead of being transported between the external storage tank and the electrochemical cell. Second, the active materials can be dense solids implemented in a packed bed arrangement, allowing for precise control of the electrode properties without conductive additives or binders. This leads to higher energy density, and performance. Third, this technology avoids the energy-consuming task of pumping high viscosity active materials.

The concentration of the mediators will affect energy density and overall battery efficiency. In an embodiment, the first and second mediators are approximately in equal amounts in the system, such as 45:55 to 55:45 by molar ratio of first mediator to second mediator. In another embodiment, the first and second mediators may have more widely unbalanced molar ratios ranging from 10:90 to 90:10, or 25:75 to 75:25.

Improvements to system energy density and efficiency may be realized by assembling a flow battery system where the difference between mediator potential and lithium-insertion potential is very small, only large enough to provide a driving force for electron transfer. In an embodiment, the redox potentials of the mediators for the positive or negative electrode are within 150 mV of the redox potential of the corresponding charge-transfer compound (i.e., the active electrode that is stored in the container). For example, the redox potentials of the mediators for the positive or negative electrode are selected to be within 10 to 125 mV, or 10 to 100 mV of the redox potential of the corresponding charge-transfer compound. Thus, the extra voltage required by mediation during charge or discharge is minimized so that the round-trip voltage efficiency, discharge voltage, and effective energy content of the system are maximized.

In an embodiment, the first, second, or first and second mediators, for either the anode or cathode side of the flow battery cell are arenes. For example, an anode may comprise an arene selected from: biphenyl, or polyarenes such as methylnaphthalene, naphthalene, acenaphthalene, pyrene, anthracene, coronene, perylene, tetracene, fluorene, azulene, and chrysene, and substituted derivatives of any thereof. The arene may comprise both substituted and unsubstituted arene rings. The substituted arene may include one or more substituent groups, R, wherein each R is independently selected from a linear, branched, cyclic, or aromatic alkyl group having 1-50 carbon atoms, optionally functionalized with a functional group including O, S, or N.

The class of arenes provides a broad spectrum of redox potentials needed for this application (see for example: Buchanan et al Organic Mass Spec., 19, (1984) p. 486; Holy, Chem. Rev. 74 (1974) p. 243). However these potentials are influenced by solvent interactions. Stabilization afforded by solvation, however, is not uniform, exerting greater influence on smaller anion radicals. Cations that are not coordinated (or weakly coordinated) with the solvent form contact ion pairs with the opposing anion radical, whereas strongly coordinated cations form solvent-separated ion pairs with the anion radical. Kinetics of anion radical reactions that involve solvent shell (or solvent coordination) reorganization are influenced by these counter ion interactions.

In an embodiment, to provide substantial and surprising improvement to the efficiency and energy density of the mediated redox flow battery, a class of redox-active mediators with excellent redox potential and stability are employed. Biphenyl in particular, is capable of receiving the most negative charge, and this corresponds to a higher energy density. The highly negative biphenyl radical is only stably solubilized in a few solvents and is reactive against many separator materials. The thermodynamic and kinetic properties of biphenyl or a substituted derivative thereof are matched to a solvent system, a compatible separator, and the active electrode (charge-storing) material in the external containers. The properties of the biphenyl anion radical are governed by the molecular structure, the counter cation, and the solvent interactions. The molecular structure defines the electron affinity which is proportional to the redox potential of the biphenyl or substituted derivative thereof.

Anion radicals undergo two types of reactions of consequence for energy storage applications. In the first reaction, the aromatic nucleus simply serves as a reservoir for the single unpaired electron. When brought into contact with a receptor (discharged primary anode material), the electron is quickly transferred to the receptor and the primary anode is charged. This is the dominant and preferred reaction for energy storage. This direct charge transfer is typically not strongly influenced by solvation. In the second reaction, radical anions behave as strong bases which can extract protons from weakly acidic substances. This deprotonation can initiate the dearomatization and quenching of the arene radical itself. This mechanism represents the fundamental basis for the very common and versatile Birch dearomatization reactions. This reaction is a deleterious side-reaction for energy storage.

In an embodiment, the primary anode (in the plug flow reactor) is $Li_xSn$ alloy and $Li^+(arene^{\cdot-})$ is present as a first mediator. The $Li^+(arene^{\cdot-})$, e.g. $Li^+biphenyl^{\cdot-}$ is referred to as "$Li^+\beta^{\cdot-}$" herein. In THF solvent (as described by Tan, Grimsdale, Yazami, J. Phys. Chem. B, 116 (2012) p. 9056, $Li_{1.0}\beta_{1.0}(THF)_{8.2}$), the radical will reduce the primary anode, $Li_xSn$ (x=0) to $Li_{2.6}Sn$. This represents a charge capacity of 587 mAHr/g. To discharge the primary anode, a second arene, e.g. pyrene, or α as used herein, is included in the anode electrolyte at the same molar concentration as the biphenyl. Pyrene will oxidize the $Li_{2.6}Sn$ to $Li_{0.6}Sn$, yielding the solvated ion pair $Li^+\alpha^{\cdot-}$, which is cycled to the electrode stack to regenerate the parent pyrene. Thus, the overall charge reaction is:

$$\beta + Li^+ + e^- \rightarrow Li^+\beta^{\cdot-} \quad [1.1]$$

 [1.2] Mediated Charge

The reaction in [1.1] occurs in the electrode stack. The reaction in [1.2] occurs in the plug flow anode reservoir reactor. The overall discharge reaction is:

$$Li^+\alpha^{\cdot-} \rightarrow \alpha + Li^+ + e^- \quad [2.1]$$

 [2.2] Mediated Discharge

The reaction in [2.1] occurs in the electrode stack. The reaction in [2.2] occurs in the plug flow anode reservoir reactor. It should be noted that the discharge reaction is not merely the reverse of the charge reaction.

This mediated charge will require 12.5 g of $Li+\beta^{\cdot-}$ solution for every gram of $Li_{0.6}Sn$ that is reduced to $Li_{2.6}Sn$, or 1 g of $Li+\beta^{\cdot-}$ solution should be regenerated and cycled 12.5 times through the Sn reactor. Likewise 12.5 g of a solution will be required to oxidize one g of $Li_{2.6}Sn$ to $Li_{0.6}Sn$. If the redox flow battery anode reservoir is designed to contain 1 kg of Sn and 100 g of α+β solution, then each anion radical will circulate 125 times to achieve a full charge/discharge cycle between $Li_{2.6}Sn$ and $Li_{0.6}Sn$ and the total capacity of the primary anode plus the arene solution will be 410 mAHr/g compared to 72 mAHr/g for the α+β arene solution alone. This compares to about 25 mAHr/g for a vanadium redox flow battery.

In an embodiment, the mediated redox flow battery half-cell may have a total charge capacity almost equal to the charge capacity of the solid anode material. The overall battery capacity and corresponding energy density will depend on the engineering design particularly the weight ratio of the solid anode to the arene solution and upon the concentrations of the arenes. It will also depend on the weight ratio of the solid cathode and cathode mediators and their concentrations.

During charge, all of the pyrene is converted to $Li+\alpha^{\cdot-}$ and it does not (and thermodynamically cannot) take part in the charge reaction for the primary anode; and during discharge all of the biphenyl is unreduced and it does not (and thermodynamically cannot) take part in the discharge reaction of the primary anode. This thermodynamic voltage separation between the two redox mediators should bracket the thermodynamic potential of the primary anode material ($Li_xSn$ in this example) by design. The roundtrip efficiency will depend on the relative potentials of the α and β redox reactions compared to the redox potential of the primary anode. These redox potentials, in turn, depend on the electron affinities of the respective arenes and solvent stabilization of the corresponding anion radicals.

Since all electronic charge is carried to and from the primary anode by convective flow of anion radicals (not electronic conductors), very large stoichiometric currents can be used with no ohmic losses except across the separator membrane in the electrode stack (flow of 1 M solution of $\beta^{\cdot-}$ 1 ml/sec=stoichiometric current of 100 A).

These concepts which were described in application to the anode of the redox flow battery are similarly applied to the cathode using different redox mediators appropriate to the primary cathode material.

In the exemplary redox flow battery, the electrolyte contains a dissolved salt, such as a lithium or sodium salt in a solvent. The solvent should be selected to dissolve the mediators used in the system. The solvent may also be selected to stabilize the ionic radicals and facilitate the redox reaction. In an embodiment, the solvent is non-aqueous.

Radical anions behave as strong bases that can extract protons from weakly acidic substances. For this reason, very negative (thermodynamically negative) anion radicals should be paired with stabilizing solvents. Solvents suitable for use with the very negative mediators include: THF (tetrahydrofuran), DME (dimethoxyethane), and glycol ethers, such as diglyeme, triglyme, and tetraethyleneglycol dimethylether solvent (TEGDME, also known at tetraglyme). Glycol ethers support high concentrations of anion radicals and strongly coordinate with cations. In an embodiment, the solvent is non-aqueous such as diglyeme, triglyme, and tetraethyleneglycol dimethylether. Certain mediators, such as biphenyl are soluble in TEGDME up to about 5 Molar, such as 0.5 M to 4.5 M or 3 M to 4.8 M.

In a mediated redox flow battery the active electrode material is housed completely in the exterior container. The active electrode material functions to store charge and participate in redox reactions with the mediators that flow into the electrode chambers of the battery cells. In an embodiment the active electrode in the external container is configured to operate as a plug-flow reactor.

In an embodiment, a lithium alloy may be used as the external charge storing active electrode (anode). Lithium may be alloyed with a metal such as Sn, Bi, Sb, Ga, or Si. Intermetallics (for Li) such as InSb, $Cu_6Sn_5$, and $Cu_2Sb$ may also be used. Sodium may also be used instead of lithium.

In an embodiment, the primary anode (in the plug flow reactor) is $Li_xSn$ alloy. x=0 at full discharge, and ranges up to 2.6 at full charge.

When an alloy material, e.g., tin is reduced to form a lithium tin alloy there is a large volume of expansion. Small volume conventional batteries are limited because of this changing volume and corresponding stress on the separator. If the separator is punctured in a conventional battery that houses the active electrodes closely together a dangerous reaction can take place. However, with the design of the battery disclosed herein safety is enhanced by putting the active materials in separate containers. In addition, thicker electrodes tend to reduce power and energy densities.

The overall battery capacity and corresponding energy density will depend partly on the weight ratio of the primary anode to the arene solution. For example, the ratio of solid anode weight to arene solution weight may range from 100:1 to 100:30, such as 100:2 or 100:3 to 100:6. The same weight ratios apply for the cathode.

The stack electrodes, (cathode and anode), in an exemplary mediated redox flow battery cell are current collectors. In an embodiment, the current collector electrodes are a porous, high surface area material, such as carbon or metal foam. In an embodiment, the electrode is selected so that it will function as a current collector and will not chemically react with either of the mediators or electrolyte. In an embodiment, the electrodes may be loaded with catalyst to facilitate the charge exchange with the mediator and improve kinetics. Unlike a conventional battery, the stack electrodes of a redox flow battery do not function to store charge, the electrode only moves the electrons in and out of the solution. It does not expand or contract, or change oxidation state.

In an embodiment, the separator is an ion conducting polymer and is inert to chemical reaction with any of the mediators, their charged radical derivatives, the solvent, and/or electrolyte in the system. In an embodiment, the ion conducting separator selectively transports lithium ions or sodium ions. The separator should not allow the mediators in their parent or redox states to pass through. In an embodiment, the ion conducting polymer does not facilitate exchange of ions, which is in contrast to ion exchange membranes. In an embodiment, the redox flow battery is exclusive of ion exchange membranes.

In an embodiment, the separator comprises polyphenylene oxide (PPO) or a polyphenylene oxide gel, polyethylene oxide (PEO) or a polyethylene oxide gel. In an embodiment, the PEO separator is plasticized with the solvent tetraethyleneglycol dimethylether (TEGDME). TEGDME is stable against reduction at about the Na/Na+ redox potential (Na/Na+ redox potential=+0.132 V vs Li/Li+ redox potential) and enables the use of very negative redox mediators, such as the arenes described herein, and very negative anodes in the external container. The voltage window for TEGDME is also greater than 4 volts. This enables the use of very positive cathodes and corresponding cathode redox mediators.

In an embodiment, to fully utilize this large voltage window, radical anion redox mediators, such as the arene radicals discussed herein, are utilized at the anode because they are reversibly oxidized and reduced at very negative potentials and they are stable in TEGDME. However, several of these radicals are highly reactive with most other solvents and polymeric material used in conventional separators by deprotonation and/or dearomatization (Birch reaction). They also react readily with fluorinated polymers such as PTFE and Nafion™, which also used in separators.

Biphenyl yields the most negative potential of all polyaromatic hydrocarbons upon reduction to the radical anion (biphenyl radical anion=3•−). Its redox potential in TEGDME is β•−/β=+0.06 V vs Na/Na+ when reduced at 0.1 m concentration with Na+ counterions. Since β•− is stable in TEGDME, it follows that it should be stable against the polymer polyethylene oxide (PEO) which is comprised of the same ethylene oxide repeat units.

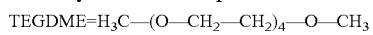

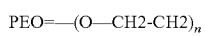

In an embodiment, the PEO material may be used by itself as the separator without the TEGDME plasticizer. The PEO or PEO and TEGDME gel separator is not limited to use with only the arene mediators or in mediated redox flow batteries.

In an embodiment, the PEO has a molecular weight ($M_V$) ranging, for example from 100,000 to 1,000,000, such as 200,000 to 750,000, or 400,000 to 650,000.

Because of the design of the mediated redox flow battery, the separator is not subject to the expansion and contraction forces of other types of batteries. Thinner separator materials may be used, for example, having thicknesses of 0.005 inches to 0.0005 inches, such as 0.0025 to 0.00075, or 0.001 to 0.0009.

In an embodiment, the mediated redox flow battery disclosed herein can mitigate key concerns involving both performance and safety of high capacity batteries. The battery of the present disclosure may be integrated into an electrical grid storage system, wherein, for example, an intermittent, but renewable source, such as wind-generated power, wave-generated power, solar power, or other power sources are used to charge the battery.

Of significant importance to large scale energy storage, the charged primary anode and charged primary cathode are not maintained in the electrode stack in close proximity. Instead they are stored in safely separated reservoirs. Any short circuit or mechanical failure or separator breach in the cell stack does not involve at catastrophic liberation of heat. Instead these failure modes represent simple benign electron transfer between small quantities of relatively dilute solution of radical anions and polycyclic hydrocarbons. This very high energy density technology is inherently safe.

EXAMPLES

By way of example and not limitation, the following examples are illustrative of various embodiments of the present disclosure.

In an example, polyethylene oxide (PEO) (Sigma-Aldrich, average molecular weight 600,000 (Mv) was dissolved in acetonitrile (AN) to make a 5 wt. % PEO solution. This solution was maintained over 4 A molecular sieves for several days before use.

Sodium triflate (NaTFS) was dissolved in AN to make a 4 wt. % NaTFS solution. This solution was also stored over 4 Angstrom molecular sieves.

These stock solutions were blended together with TEGDME (also stored over 4 A molecular sieves) to make several solutions of varying compositions which, upon casting onto glass or stainless steel substrates yielded polymeric films after evaporation of the AN solvent.

The molar composition of the resulting polymeric film is designated [na:peo:tegdme], where na represents the number of moles of Na, peo represents the number of moles of oxygen (in PEO), and tegdme represents the number of moles of TEGDME. For example, a film with composition [1:8:2] contains eight moles of oxygen (in PEO) for every mole of Na, and 2 moles of TEGDME for every mole of Na. This film would comprise 17.6 wt. % NaTFS, 36.4 wt. % PEO and 46.0 wt. % TEGDME. If it is assumed that the PEO and TEGDME form a uniform solid (gel) electrolyte, and it is assumed that the NaTFS is dissolved in that electrolyte, then the Na+ concentration is 1.25 molal in the dry film.

To measure the specific ionic conductivity of each film, the corresponding acetonitrile solution was pipetted into a stainless steel CR2032 button cell can and evaporated to dryness in the glove box, the can was then held at 40° C. on a hot plate in the glove box for about three hours, then held under vacuum at ambient temperature over-night. This procedure yielded a film 2±0.5 mils thick in the bottom of the can. On the following day the button cell was assembled in the glove box using two 20 mil thick stainless steel spacers and a wave spring. This yielded a conductivity cell with two stainless steel blocking electrodes.

Before specific conductivity measurements were made, each button cell was thermally cycled from room temperature to 50° C. three times to anneal stresses in the film and at the stainless steel/film interfaces. Specific conductivity measurements were made about one hour after thermal equilibration. The results are shown in Table 1.

Table 1 summarizes the specific conductivities and respective activation energies for all the sample film compositions.

TABLE 1

Specific Conductivities for PEO-TEGDME-NaTFS Separators.

| Button Cell Sample Id | Composition [na:peo:tegdme] | Na+ Conc molal | wt. % TEGDME | Sp Cond 45° C. (Ohm * cm)$^{-1}$ | Activation Energy eV |
|---|---|---|---|---|---|
| BC3 | [1:8:1] | 1.74 | 30 | 1.8E-4 | 1.0 |
| BC4 | [1:8:2] | 1.25 | 46 | 5.1E-4 | 0.88 |
| BC11 | [1:8:4] | 0.81 | 63 | 5.1E-4 | 1.01 |
| BC9 | [1:6:1] | 2.05 | 34 | 9.2E-5 | 0.59 |
| BC7 | [1:6:2] | 1.41 | 50 | 6.8E-4 | 1.1 |
| BC16 | [1:6:4] | 0.87 | 67 | 7.8E-4 | 0.94 |
| BC21 | [1:4:1] | 2.51 | 39 | 1.9E-4 | 0.49 |
| BC13 | [1:4:2] | 1.61 | 56 | 6.4E-4 | 0.33 |
| BC14 | [1:4:4] | 0.94 | 72 | 8.6E-4 | 0.82 |
| BC15 | [1:6:0] | 3.78 | 0 | 6.8E-7 | 0.73 |

TEGDME was added to each film as a plasticizer to reduce the crystallinity and increase the free volume. This resulted in about 3 orders of magnitude increase in the conductivity of the films compared to the NaTFS-PEO film containing no plasticizer.

To test the PEO films in a redox flow cell, larger (about 5 cm×5 cm) films were cast onto glass plates and air dried in a laboratory fume hood. After dryness, the film was heated on a hot plate at 40° C. for about three hours. A 1.5 in. diameter circle was cut into the film, and the disc was peeled off of the glass substrate and stored under vacuum until assembly in the redox flow cell. These films were also 2±0.5 mils thick.

The test cell consisted of stainless steel plates with machined flow fields behind 7.9 cm$^2$ 10 AA carbon paper disc electrodes (SGL Technologies GmbH). The design assured compression of the electrodes against the separator using a "zero gap" configuration. See D. Aaron, Q. Liu, Z. Tang, G. Grim, A. Papandrew, A. Turhan, T. Zawodzinski and M. Mench, Journal of Power Sources, 206 (2012) p. 450, and Q. Liu, G. Grim, A. Papandrew, A. Turhan, T. Zawodzinski and M. Mench, J. Electrochem. Soc., 159(8) (2012) A1246. A Celgard™ 2500 separator was placed on one side or both sides of the separator to help prevent short circuits. In some cases 10 wt. % $Al_2O_3$ powder was added to the polymer film to make it more ridged. The test cell had a solution of biphenyl and biphenyl anion radical (in TEGDME) on both sides of the separator. On the anode side biphenyl was reduced to biphenyl anion radical and on the cathode side biphenyl anion radical was oxidized to biphenyl. Na$^+$ was transported through the film. This test exercised the separator in the radical anion environment and demonstrated that it was chemically stable in the environment for the duration of the test, which was about 1 month.

The resistance of the test cell containing biphenyl anion radicals remained constant for one month indicating that the separator is stable in the presence of the biphenyl anion radical for this period. Post mortem of the cell showed no visible physical or chemical deterioration of the PEO.

The TEGDME plasticized PEO films serve as stable separators for anion radical mediated redox flow batteries which utilize TEGDME electrolytes. The area specific resistance of the separator at room temperature is about 40 Ohm*cm$^2$. This is 4× to 6× higher than the conventional separators in commercial lithium batteries.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the FIGURES to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description various features are sometimes grouped together in a single embodiment, FIGURE, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A redox flow battery comprising:
    a half-cell electrode chamber coupled to a current collector electrode; and
    a polymeric lithium and/or sodium ion conducting separator coupled to the half-cell electrode chamber, wherein the half-cell electrode chamber comprises a first redox-active mediator and a second redox-active mediator, wherein the first redox-active mediator and the second redox-active mediator are circulated through the half-cell electrode chamber into an external container, wherein
    the external container comprises an active electrode material;
    the active electrode material has a redox potential between a redox potential of the first redox-active mediator and a redox potential of the second redox-active mediator, wherein the first mediator is reduced at the current collector electrode and the reduced first mediator reduces the active electrode material during a charging cycle and wherein the second mediator is reduced by the reduced active anode material and the reduced second mediator is oxidized at the current collector electrode during a discharging cycle; and
    the first mediator comprises a first arene, wherein the first arene is a polyaromatic hydrocarbon, biphenyl, or a substituted derivative of either thereof.

2. The redox flow battery of claim 1, wherein the second mediator comprises a second arene, wherein the second arene is a polyaromatic hydrocarbon, biphenyl, or a substituted derivative of either thereof, with the proviso that the second mediator is not the same as the first mediator.

3. The redox flow battery of claim 1, wherein the first and second mediator are dissolved in a non-aqueous solvent.

4. The redox flow battery of claim 3, wherein the solvent is selected from the group consisting of: diglyme, triglyme, tetraethyleneglycol dimethylether, and mixtures thereof.

5. The redox flow battery of claim 1, wherein the first or second arene is biphenyl or a substituted derivative thereof.

6. The redox flow battery of claim 1, wherein the first, second, or first and second arene is substituted, and includes one or more substituent groups, R, wherein each R is independently selected from a linear, branched, cyclic, or aromatic alkyl group having 1-50 carbon atoms, optionally functionalized with a functional group including O, S, or N.

7. The redox flow battery of claim 1, wherein the active electrode in the external container is in a plug-flow reactor configuration.

8. The redox flow battery of claim 1, wherein the first mediator is soluble in a solvent at a molarity 0.5 M to 5 M.

9. The redox flow battery of claim 1, wherein the half-cell electrode chamber is an anode cell chamber and the electrode is an anode.

10. A redox flow battery comprising:
    a half-cell electrode chamber coupled to a current collector electrode, wherein the half-cell electrode chamber comprises a first redox-active mediator and a second redox-active mediator, wherein the first redox-active mediator and the second redox-active mediator are circulated through the half-cell electrode chamber into an external container, wherein
    the external container comprises an active electrode material;
    the active electrode material has a redox potential between a redox potential of the first redox-active mediator and a redox potential of the second redox-active mediator, wherein the first mediator is reduced at the current collector electrode and the reduced first mediator reduces the active electrode material during a charging cycle and wherein the second mediator is reduced by the reduced active anode material and the reduced second mediator is oxidized at the current collector electrode during a discharging cycle; and
    the first mediator comprises a first arene, wherein the first arene is biphenyl or a substituted derivative thereof.

11. The redox flow battery of claim 10, wherein the second mediator comprises a second arene, wherein the second arene is substituted or unsubstituted, with the proviso that the second arene is not the same as the first arene.

12. The redox flow battery of claim 10, wherein a single cell of the battery has a voltage of 1 to 4.

13. The redox flow battery of claim 10, wherein the first and second mediator are dissolved in a non-aqueous solvent.

14. The redox flow battery of claim 13, wherein the solvent is selected from the group consisting of: tetrahydrofuran, dimethoxyethane, diglyme, triglyme, tetraethyleneglycol dimethylether and mixtures thereof.

15. The redox flow battery of claim 13, wherein the second arene is selected from the group consisting of: biphenyl, methylnaphthalene, naphthalene, acenaphthalyne, pyrene, anthracene, coronene, perylene, tetracene, fluorene, azulene, and chrysene, and substituted derivatives of any thereof, with the proviso that the second arene is not the same as the first arene.

* * * * *